Feb. 26, 1929.

A. M. OLSON

KITCHEN TOOL

Filed Feb. 27, 1928

Inventor:
Annie May Olson

Patented Feb. 26, 1929.

1,703,356

UNITED STATES PATENT OFFICE.

ANNIE MAY OLSON, OF ROLETTE, NORTH DAKOTA.

KITCHEN TOOL.

Application filed February 27, 1928. Serial No. 257,420.

The invention relates to a combination kitchen tool; and the object of the tool is to provide a means for lifting hot pans and stove lids and to supply a handle for a detachable meat pounder.

Figure 1:
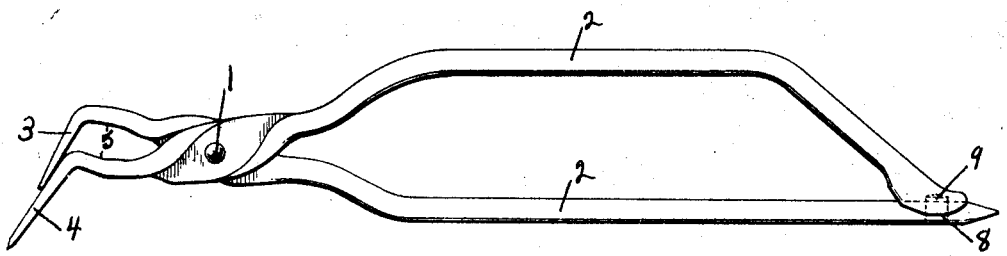
Figure 2:
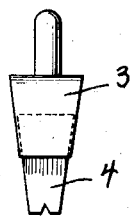
Figure 3:
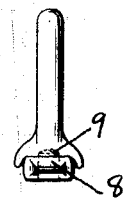
Figure 4:
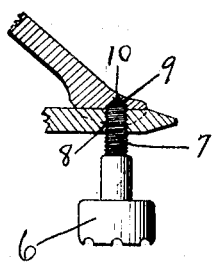
Figure 5:
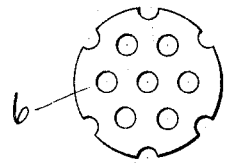

The invention is illustrated in the accompanying drawing, in which Figure 1 is a side view of the two handles which are fastened together by the rivet 1; Fig. 2, an end view of the jaws; Fig. 3, an end view of the handles showing how they fit together; Fig. 4, a cross section of the ends of the handles showing how the meat pounder is inserted; Fig. 5, the pounding face of the meat pounder.

The handles 2 2 are held together in plier like fashion by the rivet 1. By moving the handles the jaws 3 and 4 are opened and closed.

The jaws are bent downward near their middle, are parallel at their ends and are capable of coming tightly together at the ends—but leaving a space 5 between them at their rear parts. This provides space to receive the rim of a pan which will rest against the lower jaw and thus be held securely. The jaw 3 (see Fig. 1) when inserted in a stove lid, will, when jaw 4 is tightened toward it, hold the lid securely.

Space 5, between the two jaws (see Fig. 1), in addition to receiving pan rims provides a satisfactory means for cracking nuts or holding hot objects.

The pounder 6 (see Fig. 4) has a stem on it, the upper part of which is threaded so as to screw into the end of the lower handle through the threaded hole 8 Figs. 1 and 4. The threaded end of the pounder is rounded, see 10, Fig. 4. This end, when the pounder is screwed into the handle to the full length of the thread, will come to rest in the cup 9 of the upper handle Figs. 1 and 4. Thus when the handles are tightened it is held solidly.

I am aware that prior to my invention tong-like tools have been made for lifting objects, and also that meat pounders have long been in use. I therefore do not claim a combination of the two broadly; but

I claim:

A combination tool comprising a pair of tongs, the jaws being bent downwardly from the fulcrum into close contact with one another near their ends and spaced from each other, except close to the pivot point, where a larger space between the jaws prevents them from coming closely together there, one of the handles being provided with an opening and the other with a recess registering with the opening, the opening being screw threaded to receive the stem of a meat pounder, the end of said stem entering the recess.

MRS. ANNIE MAY OLSON.